United States Patent [19]
Jansen

[11] Patent Number: 6,137,258
[45] Date of Patent: Oct. 24, 2000

[54] SYSTEM FOR SPEED-SENSORLESS CONTROL OF AN INDUCTION MACHINE

[75] Inventor: Patrick Lee Jansen, Alplaus, N.Y.

[73] Assignee: General Electric Company, Schenectady, N.Y.

[21] Appl. No.: 09/178,760

[22] Filed: Oct. 26, 1998

[51] Int. Cl.[7] .................................................. H02P 5/34
[52] U.S. Cl. ...................... 318/802; 318/807; 318/809; 318/811
[58] Field of Search .................. 318/727–832

[56] References Cited

U.S. PATENT DOCUMENTS

| | | | |
|---|---|---|---|
| 4,445,080 | 4/1984 | Curtiss ..................................... | 318/798 |
| 5,559,419 | 9/1996 | Jansen et al. . | |
| 5,565,752 | 10/1996 | Jansen et al. ............................ | 318/807 |
| 5,585,709 | 12/1996 | Jansen et al. ............................ | 318/807 |
| 5,729,113 | 3/1998 | Jansen et al. . | |
| 5,796,235 | 8/1998 | Schrodl et al. . | |

FOREIGN PATENT DOCUMENTS

| | | |
|---|---|---|
| 4103270 | 5/1992 | Germany . |
| WO 97/08820 | 3/1997 | Germany . |
| 8-149898 | 7/1996 | Japan . |

OTHER PUBLICATIONS

PL Jansen, et al, "Observer–Based Direct Field Orientation: Analysis and Comparison of Alternative Methods", IEEE Trans. On Industry Applications, vol. 30, No. 4, Jul./Aug. 1994, pp. 945–953.

PL Jansen, et al, "Transducerless Field Orientation Concepts Employing Saturation–Induced Saliencies in Induction Machines", 1995 IEEE, pp. 174–181.

F. Blaschke, et al, "Sensorless Direct Field Orientation at Zero Flux Frequency", IEEE–IAS Meeting, Oct. 1996, pp. 189–196.

PL Jansen, et al, "Transducerless Field Orientation Concepts Employing Saturation–Induced Saliencies in Induction Machines", IEEE Trans on Industry Applications, vol. 32, No. 6, Nov./Dec. 1996, pp. 1380–1393.

Y. Xue, et al, "A Stator Flux–Oriented Voltage Source Variable–Speed Drive Based on dc Link Measurement", IEEE Trans. on Ind. Appl. vol. 27, No. 5, Sep./Oct. 1991, pp. 962–969.

PL Jansen, et al, "Transducerless Position and Velocity Estimation In Induction and Salient AC Machines", *IEEEE–TAS* Annual Meeting, Denver, Oct. 1994, pp. 488–495.

*Primary Examiner*—David S. Martin
*Attorney, Agent, or Firm*—Ann M. Agosti; Jill M. Breedlove

[57] ABSTRACT

A system for speed-sensorless control of an induction machine includes a flux regulator & torque current calculator for operating the machine in a heavily saturated state to produce a saturation induced saliency; a saliency tracker for tracking an angle of the saturation-induced saliency; a signal injector for injecting an AC signal aligned with a saliency axis; voltage and current determiners for determining stator voltages and currents; and a rotor flux calculator for using the saturation-induced saliency angle, the determined stator voltages, and the determined stator currents to determine a magnitude and a location of a rotor flux vector. The flux regulator & torque current calculator is adapted to use the rotor flux vector to control the induction machine.

20 Claims, 5 Drawing Sheets

SYSTEM FOR SPEED-SENSORLESS CONTROL OF AN INDUCTION MACHINE

BACKGROUND OF THE INVENTION

The present invention relates generally to highly accurate and robust control of induction machines from inverter drives without the use of rotor position or speed sensors for feedback. The terms "sensorless", "speed-sensorless", "transducerless", "tachless", and "encoderless" are all used interchangeably to describe such control methods.

Methods of achieving direct field orientation (DFO) of induction machines are described in Jansen et al., "Observer-Based Direct Field Orientation: Analysis and Comparison of Alternative Methods," IEEE Transactions on Industry Applications, Vol. 30, No. 4, July/August 1994, pp. 945–953. DFO is based upon estimation of either the rotor or stator flux from the terminal voltage and current. For rotor flux DFO systems, cross coupling between the torque current and rotor flux can be nearly eliminated by orienting the rotor flux as the d-axis reference frame with a rotor flux observer, and the torque command can be calculated using the estimated rotor flux from the observer to adjust the commanded rotor flux. A closed-loop rotor flux observer estimates flux primarily in the stationary frame and includes two open-loop rotor flux observers which are referred to as current and voltage models. The current model uses measured stator current and rotor position to produce a flux estimate, while the voltage model relies on the measured stator voltage and current. Jansen et. al. further describes a motor drive system including an induction motor driven by a current regulated pulse width modulating (PWM) amplifier, a torque and flux regulator, a synchronous-to-stationary frame transformation block, current sensors, voltage sensors, a three-two phase transformation block, a flux observer, stationary-to-synchronous frame transformation blocks, and a velocity observer.

A method for flux estimation in induction machines is described in Jansen et al., U.S. Pat. No. 5,559,419, issued Sep. 24, 1996, wherein AC drive power is supplied to stator windings at a fundamental drive frequency which is at a level sufficient to provide magnetic saturation in the stator and at a signal frequency which is substantially higher than the drive frequency and wherein the response of the stator windings is measured to determine the variation of the response as a function of time during operation of the motor to determine the angular position and/or the speed of the magnetic flux vector. More specifically, a heterodyne demodulator mixes a signal which is a function of the high signal frequency with the response from the stator windings to provide a signal indicative of the rotational position of the magnetic flux vector. A drawback of this embodiment is that the injected signal is a balanced rotating AC signal, which produces an undesirable torque ripple at the signal frequency.

A means of integrating the flux estimation scheme described in U.S. Pat. No. 5,559,419, with a DFO scheme to obtain wide-speed-range sensorless control down to and including sustained zero frequency operation, was demonstrated via simulation in Jansen et. al, "Transducerless Field Orientation Concepts Employing Saturation-induced Saliencies in Induction Machines," IEEE Transactions on Industry Applications, Vol. 32, No. 6, November/December 1996.

Blaschke et al., "Sensorless Direct Field Orientation at Zero Flux Frequency," IEEE-IAS Annual Meeting, October 1996, describes operating AC machines in a saturated condition and superimposing an AC test current vector on a command stator current vector. By injecting an AC test current on the rotor flux axis, the system of Blaschke et al. assumes that the rotor flux axis is aligned with the saliency axis. In practice, the two axes are not always sufficiently aligned. For many motor designs, especially with closed rotor slots, the rotor flux axis and the saliency axis may shift by up to 90 degrees when operating from no load to full load. A system that does not take this shift into account may not always be stable and may not always produce the desired torque and control performance.

Unlike the embodiment in U.S. Pat. No. 5,559,419 which tracks a saturation-induced variation in the stator transient inductance, the embodiment of Blaschke et al. attempts to track a saturation-induced variation in the magnetizing inductance. With most induction machines and with high frequency signal injection (>50 Hz), the effects of the variation in stator transient inductance due to saturation will greatly outweigh the effects of the variation in magnetizing inductance as seen by the injected AC signal from the stator terminals. Thus a scheme designed to track variations in stator transient inductance caused by saturation is more desirable as a general purpose means of achieving zero frequency tachless control.

SUMMARY OF THE INVENTION

It is therefore seen to be desirable to provide a speed-sensorless control system which provides robust control of an induction machine while maintaining rotor flux orientation even when the saliency axis is not aligned with the rotor flux axis, which also utilizes AC signal injection in such a manner as to minimize torque ripple and to track variations in the stator transient inductance.

Briefly, according to one embodiment of the present invention, a system for speed-sensorless control of an induction motor includes: a saliency tracker for tracking an angle of a saturation-induced saliency in a stator transient inductance, and a signal injector for adding an injected AC signal aligned with the saturation-induced tracked saliency angle to a fundamental AC signal.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION OF PREFERRED EMBODIMENTS OF THE INVENTION

Figure 1:
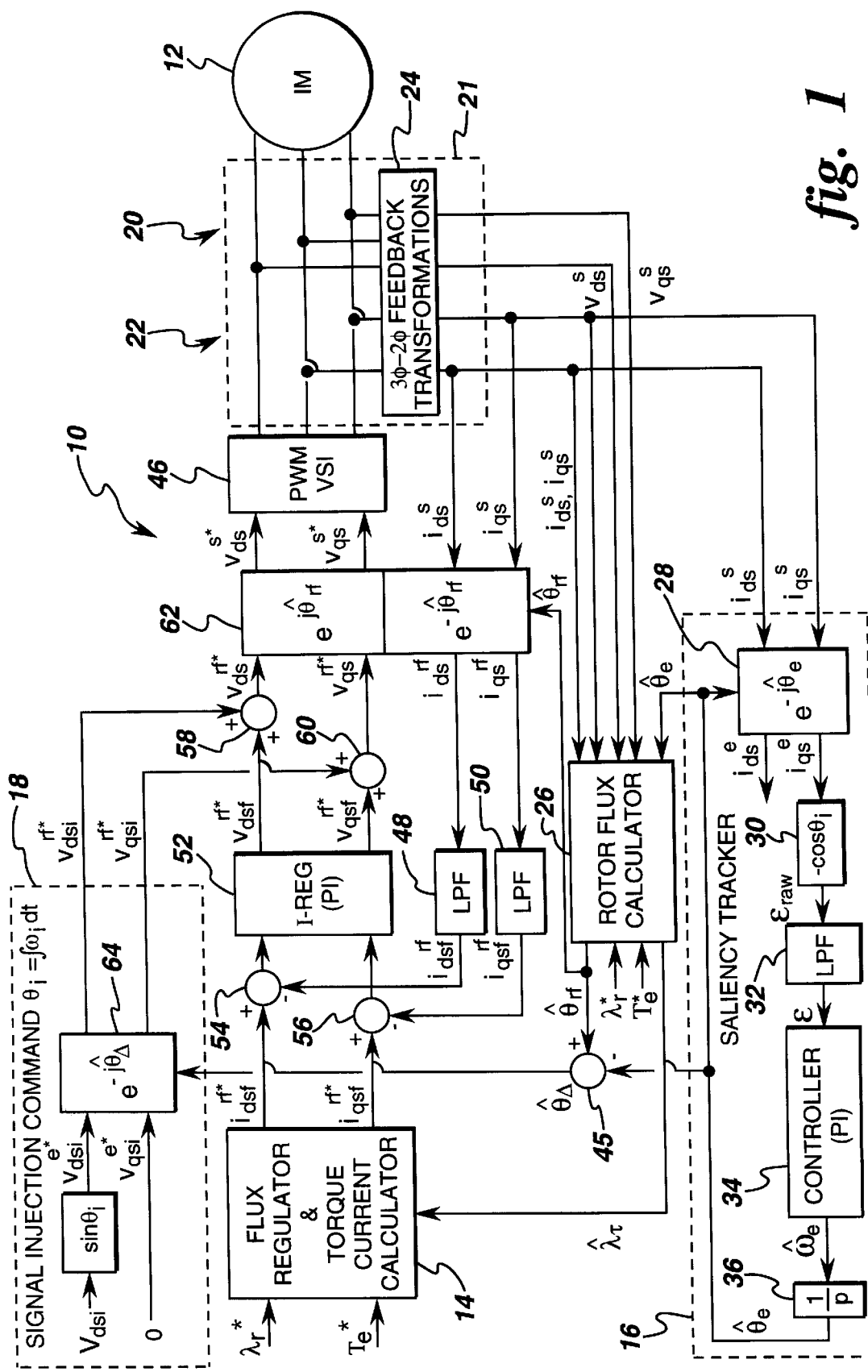
FIG. 1 is a block diagram of one embodiment of a motor drive system of the present invention.
Figure 2:
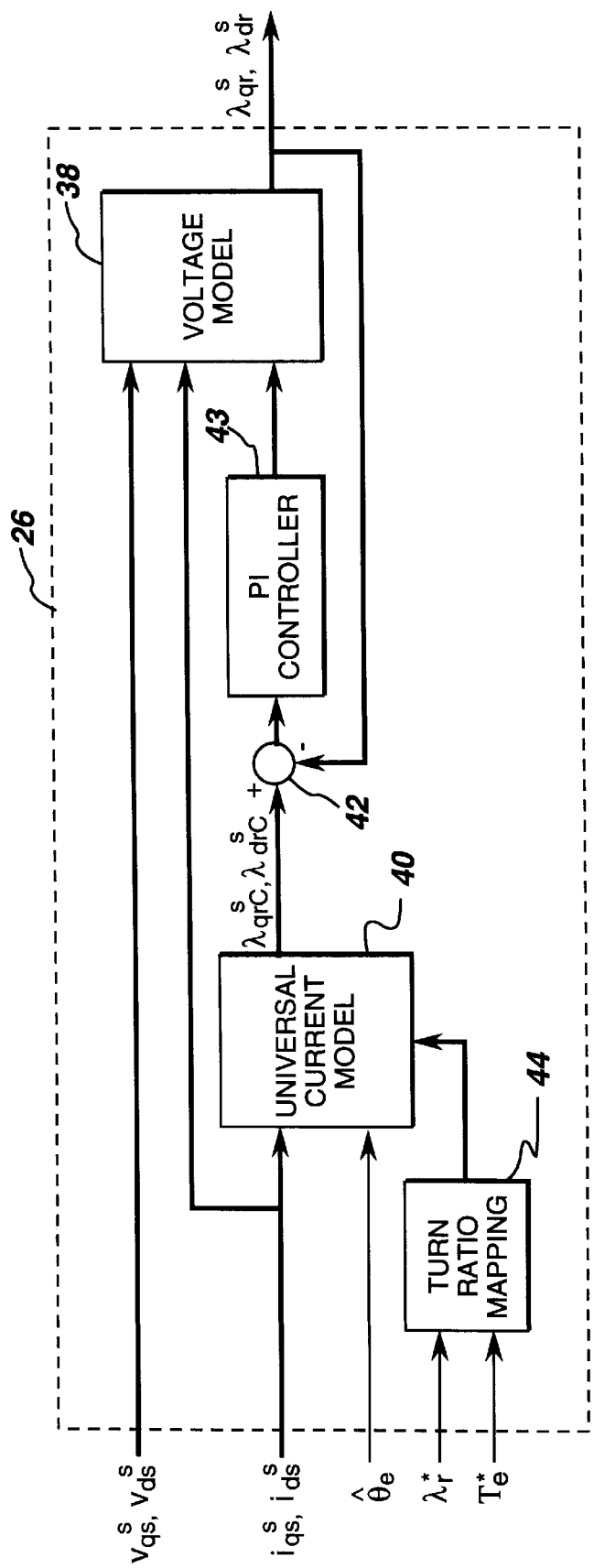
FIG. 2 is a block diagram of a rotor flux calculator for use in the embodiment of FIG. 1.

One embodiment of the present invention is shown in the block diagram of the motor drive system of FIG. 1. FIG. 2 is a block diagram of a rotor flux calculator for use in the embodiment of FIG. 1. This invention can be used with speed-sensorless induction machines. Speed-sensorless means not requiring rotor position or speed sensors, and induction machine means machines capable of acting as induction motors and/or as induction generators. Although the invention is illustrated in FIG. 1 with voltage signal injection, current signal injection can alternatively be used, as discussed below. Additionally, although the Figures show separate blocks, in practice, a computer will perform the functions illustrated by the blocks digitally, with the exception of the voltage source inverter (VSI) 46. The invention is also applicable to analog implementations, as well as implementations combining analog and digital elements. Because the present invention involves operating the machine in a heavily saturated state, it is most useful when a machine is operating at frequencies in the range of zero (0) to about one (1) Hertz.

In FIG. 1, a system 10 for sensorless control of an induction machine 12 is shown as including a flux regulator & torque current calculator 14 for operating the motor in a heavily saturated state to produce a saturation induced saliency, a saliency tracker 16 for tracking an angle of the saturation-induced saliency in the stator transient inductance; a signal injector 18 for injecting an AC signal aligned with a saliency axis; voltage and current determiners 21 for determining stator voltages and currents; and a rotor flux calculator 26 for determining a magnitude and a location of a rotor flux vector. The rotor flux calculator may comprise any conventional rotor flux calculator such as a rotor flux observer or a rotor flux estimator, and the present invention is not intended to be limited to the specific rotor flux observer embodiment of FIG. 2 that is provided for purposes of example. The flux regulator & torque current calculator is adapted to use this rotor flux vector to control the induction motor. Also shown in FIG. 1 are associated transformation blocks, regulators, and filters.

The method of signal injection and demodulation for saliency tracking, coupled with a dynamically adjusted rotor flux calculator such as shown in FIG. 2, enables sensorless control over a wide speed range, including zero frequency, with low torque ripple.

Induction machine 12 comprises a polyphase AC induction machine driven by a control system including an inverter bridge shown as pulse width modulating voltage source inverter (PWM VSI) 46 and associated digital controls. Flux regulator and torque current calculator 14 receives flux command $\lambda^*_r$ and torque command $T^*_e$ signals from an external controller (not shown), and provides fundamental component stator current commands $i_{dsf}^{rf*}$ and $i_{qsf}^{rf*}$ in the rotor flux frame in a manner such as discussed in aforementioned Jansen et al., "Observer-Based Direct Field Orientation: Analysis and Comparison of Alternative Methods." These commands are supplied to respective subtractors 54 and 56 which subtract respective fundamental components $i_{dsf}^{rf}$ and $i_{qsf}^{rf}$ of the stator current in the rotor flux frame and provide the differences to a proportional integral regulator (I-Reg) 52. I-Reg 52 in turn provides command signal components $v_{dsf}^{rf*}$ and $v_{qsf}^{rf*}$ of stator voltage in the rotor flux frame.

In the present invention, the command signal components of stator voltage are supplied to respective adders 58 and 60 where respective injected signal voltage components $v_{dsi}^{rf*}$ and $v_{qsi}^{rf*}$ are added to provide command stator voltages $v_{ds}^{rf*}$ and $v_{qs}^{rf*}$ in the rotor flux frame. Transformation block 62 rotates the command stator voltages (in the rotor flux frame) from the synchronous to the stationary frame and thereby converts them to command stator voltages $v_{ds}^{s*}$ and $v_{qs}^{s*}$ in the stator frame which are then used by PWM VSI 46 to control induction machine 12.

If desired, voltage and current determiners 21 may comprise stator current and voltage sensors 22 and 20 respectively which sense motor line stator current and voltage signals and send the signals to feedback transformation block 24 which includes signal conditioning elements such as anti-aliasing filters and a three phase to two phase transformation element to provide two phase stationary stator frame determined voltage signals $v_{ds}^s$ and $v_{qs}^s$ and determined current signals $i_{ds}^s$ and $i_{qs}^s$. Although voltage and current sensors and a feedback transformation block are shown in FIG. 1, these elements are not needed. For example, their values can be estimated in control hardware or software (shown as controller 321 in FIG. 3) as discussed for example in Y. Xue et al., "A Stator Flux-Oriented Voltage Source Variable-Speed Drive Based on dc Link Measurement", IEEE Transactions on Industry Applications, Vol. 27, No. 5, September/October 1991, pp. 962–969. In another example, the command values such as $v_{ds}^{s*}$ and $v_{qs}^{s*}$ can be used as inputs to rotor flux calculator 26.

The two phase stationary frame (stator frame) current signals are transmitted to transformation block 62 which transforms them into signals $i_{ds}^{rf}$ and $i_{qs}^{rf}$ in the rotor flux frame. Optional low pass filters 48 and 50 attenuate the signal component to minimize distortion of the injected AC signal voltages and provide the aforementioned respective fundamental components $i_{dsf}^{rf}$ and $i_{qsf}^{rf}$ of the stator current in the rotor flux frame for subtraction by subtractors 54 and 56.

The two phase stationary frame determined current signals are additionally transmitted to saliency tracker 16 which determines the angle of the rotating saliency axis. AC signal injection is chosen along the saliency-axis to minimize undesirable torque ripple since the saliency-axis is generally more closely aligned with the rotor flux-axis than the orthogonal torque-axis. The low torque ripple feature makes the invention particularly suitable for high-power AC traction and industrial control systems. Such systems typically operate at low inverter switching frequencies (e.g., 300 Hz–2 kHz) which would restrict the AC signal injection frequency to be in a range (e.g., 30–300 Hz) that would otherwise be unacceptable if torque ripple was not abated.

The stator transient inductance matrix $\overline{L}_\sigma^e$ of an induction motor with a saturation-induced saliency can be represented in the saliency reference frame of a two-phase model by:

$$\overline{L}_\sigma^e = \begin{bmatrix} L_\sigma^q & 0 \\ 0 & L_\sigma^d \end{bmatrix} \quad (1)$$

where, because of saturation, $$L_\sigma^d \neq L_\sigma^q \quad (2)$$

and wherein:

$L_\sigma^d$=d-axis stator transient inductance (saliency frame) and $L_\sigma^q$=q-axis stator transient inductance (saliency frame).

The stator transient inductance matrix $\overline{L}_\sigma^{\hat{e}}$ in a reference frame corresponding to an estimate of the saliency angular position can be shown to be $$\overline{L}_\sigma^{\hat{e}} = \begin{bmatrix} L_\sigma + \Delta L_\sigma \cos(2\theta_{err}) & -\Delta L_\sigma \sin(2\theta_{err}) \\ -\Delta L_\sigma \sin(2\theta_{err}) & L_\sigma - \Delta L_\sigma \cos(2\theta_{err}) \end{bmatrix} \quad (3)$$

where $$L_\sigma = \frac{L_{\sigma q} + L_{\sigma d}}{2} \quad \text{(mean stator transient inductance)}, \quad (4)$$

$$\Delta L_\sigma = \frac{L_{\sigma q} - L_{\sigma d}}{2} \quad \text{(difference in } d \text{ and } q\text{-axis stator transient inductances due to saturation)}, \quad (5)$$

and $$\theta_{err} = \theta_e - \hat{\theta}_e, \quad (6)$$

and wherein $\theta_e$ is the actual saliency angular position, and
$\hat{\theta}_e$ is the estimated saliency angular position.

The actual saliency angular position does not need to be directly determined. Instead, as discussed below with equation (24), an error is driven to zero such that the estimated saliency angular position tracks the actual saliency angular position.

With an injected signal frequency that is sufficiently high such that back-emf influence is negligible (i.e., $\omega_i \gg \omega_e$), and a symmetrical rotor resistance, injected signal voltages $v_{qsi}^{e^*}$ and $v_{dsi}^{e^*}$ in the estimated saliency reference frame are approximately represented by $v_{qsi}^{\hat{e}*}$ and $v_{dsi}^{\hat{e}*}$ as follows:

$$v_{qsi}^{\hat{e}*} = R_\sigma i_{qsi}^{\hat{e}} + [L_\sigma + \Delta L_\sigma \cos(2\theta_{err})] p i_{qsi}^{\hat{e}} - \Delta L_\sigma \sin(2\theta_{err}) p i_{dsi}^{\hat{e}}, \quad (7)$$

and $$v_{dsi}^{\hat{e}*} = R_\sigma i_{dsi}^{\hat{e}} + [L_\sigma - \Delta L_\sigma \cos(2\theta_{err})] p i_{dsi}^{\hat{e}} - \Delta L_\sigma \sin(2\theta_{err}) p i_{qsi}^{\hat{e}}, \quad (8)$$

where $$R_\sigma = R_1 + \frac{L_m^2}{L_r^2} R_2, \text{ and} \quad (9)$$

wherein $\omega_i$ = signal injection frequency ($p\theta_i$),
$\omega_e$ = actual saliency frequency,
$\hat{\omega}_e$ = estimated (tracked) saliency frequency,
$R_1$ = stator resistance,
$L_m$ = magnetizing inductance,
$L_r$ = rotor inductance (sum of magnetizing and rotor leakage inductances),
$R_2$ = rotor resistance,
p = time derivative operation; i.e., p=d/dt, and
$i_{qsi}^{\hat{e}}$ and $i_{dsi}^{\hat{e}}$ = signal components of determined (feedback) stator currents in the estimated saliency frame (equation 20 calculates $i_{qsi}^{\hat{e}}$)

Motor resistance and inductance values vary according to type of motor and mode of operation and can be determined by conventional control system techniques.

Signal injector 18 injects an AC signal voltage signal $V_{dsi}$ of a frequency typically between 20–800 Hz (depending upon controller sample rate and PWM switching frequency) in the estimated saliency reference frame such that $$v_{qsi}^{\hat{e}*} = 0, \quad (10)$$

and $$v_{dsi}^{\hat{e}*} = V_{dsi} \sin \theta_i \quad (11)$$

where the instantaneous AC signal injection angle $\theta_i$ is $$\theta_i = \int \omega_i dt. \quad (12)$$

The resulting stator terminal voltages contain the following signal voltage components at the signal frequency in the saliency reference frame:

$$0 = R_\sigma i_{qsi}^{\hat{e}} + [L_\sigma + \Delta L_\sigma \cos(2\theta_{err})] p i_{qsi}^{\hat{e}} - \Delta L_\sigma \sin(2\theta_{err}) p i_{dsi}^{\hat{e}}, \quad (13)$$

and $$v_{dsi}^{\hat{e}} = R_\sigma i_{dsi}^{\hat{e}} + [L_\sigma - \Delta L_\sigma \cos(2\theta_{err})] p i_{dsi}^{\hat{e}} - \Delta L_\sigma \sin(2\theta_{err}) p i_{qsi}^{\hat{e}} \quad (14)$$

which solving for the q-axis signal current becomes:

$$i_{qsi}^{\hat{e}} \cong \frac{\Delta L_\sigma \sin(2\theta_{err})}{[R_\sigma^2 + (L_\sigma^2 - \Delta L_\sigma^2) p^2 + 2 R_\sigma L_\sigma p]} p v_{dsi}^{\hat{e}} \quad \text{or} \quad (15)$$

$$i_{qsi}^{\hat{e}} \cong \frac{\Delta L_\sigma}{[R_\sigma^2 - (L_\sigma^2 - \Delta L_\sigma^2)\omega_i^2 + j2 R_\sigma L_\sigma \omega_i]} \omega_i V_{dsi} \sin(2\theta_{err}) \cos\theta_i \quad (16)$$

where $$p v_{dsi}^{\hat{e}} = \omega_i V_{dsi} \cos \theta_i. \quad (17)$$

Defining a modified transient impedance, $$Z_\sigma^2 \equiv [R_\sigma^2 - (L_\sigma^2 - \Delta L_\sigma^2)\omega_i^2 + j2 R_\sigma L_\sigma \omega_i], \quad (18)$$

wherein
$R_\sigma$ = (mean) stator transient resistance, and a saturation-induced transient impedance, $$\Delta Z_\sigma \equiv \Delta L_\sigma \omega_i, \quad (19)$$

equation (16) can be rewritten as $$i_{qsi}^{\hat{e}} \cong \frac{\Delta Z_\sigma}{Z_\sigma^2} V_{dsi} \sin(2\theta_{err}) \cos\theta_i. \quad (20)$$

Multiplication of the q-axis signal current of equation (20) by $-\cos \theta_i$ in cosine operator block 30 yields:

$$\varepsilon_{raw} = -i_{qsi}^{\hat{e}} \cos\theta_i \quad (21)$$
$$\cong \frac{\Delta Z_\sigma}{Z_\sigma^2} V_{dsi} \sin(2\theta_{err}) \left(\frac{1 + \cos 2\theta_i}{2}\right).$$

Low pass filtering $\varepsilon_{raw}$ with low pass filter 32 to remove the twice signal frequency component (as well as the fundamental component of current) yields $$\varepsilon = LPF(\varepsilon_{raw}). \quad (22)$$

$$\varepsilon \cong \frac{\Delta Z_\sigma}{Z_\sigma^2} \frac{V_{dsi}}{2} \sin(2\theta_{err}), \text{ and} \quad (23)$$

-continued $$\varepsilon \cong \frac{\Delta Z_\sigma}{Z_\sigma^2} \frac{V_{dsi}}{2} \sin[2(\theta_e - \hat{\theta}_e)]. \quad (24)$$

Equation (24), which is a mathematical equivalent of the signal which results from the motor drive system and from the synchronous transformation block 28, cosine operator block 30, and LPF 32 of the saliency tracker, thus describes an error signal that can be driven to zero via PI (proportional integral) controller 34 in the closed-loop saliency tracker to obtain $\omega_e$ (the estimated (tracked) saliency frequency) which can then be converted to $\hat{\theta}_e$ by integral block 36. The output of the tracker is then the estimated saliency angle $\hat{\theta}_e$ which can be used by the rotor flux calculator. Frequency $\hat{\omega}_e$ is calculated as an optional intermediate quantity that can be utilized for rotor speed estimation or other well known control functions.

The tracked saliency angle $\hat{\theta}_e$ feeds into rotor flux calculator (which is shown for purposes of example in FIG. 2 as a rotor flux observer 26). The two phase stationary frame determined voltage and current signals $v_{ds}^s$, $v_{qs}^s$, $i_{ds}^s$, and $i_{qs}^s$ are additionally supplied to the rotor flux observer. A detailed description of a rotor flux observer 26 (for determining a magnitude and a location of a rotor flux vector) such as shown in FIG. 2 is provided in aforementioned Jansen et al., "Transducerless field orientation concepts employing saturation-induced saliencies in induction machines". The rotor flux observer preferably includes a voltage model 38, a universal current model 40 for using the determined stator currents and the saliency angle to determine a low frequency flux vector estimate, and a subtractor 42 for subtracting the rotor flux vector from the low frequency flux vector estimate to provide a vector difference. Proportional Integral controller 43 drives the vector difference to zero. The voltage model is adapted to use the output signal of the PI controller, the determined stator voltages, and the determined stator currents to determine the rotor flux vector $\lambda_{qr}^s, \lambda_{dr}^s$ and the rotor flux angle $\hat{\theta}_{rf}$. The rotor flux angle is used by transformation block 62 and by subtractor 45/ signal injector 18.

The rotor flux observer includes a turn ratio mapper 44 for using a commanded rotor flux vector and a commanded rotor torque vector for determining a turn ratio for universal current model 40. The universal current model is adapted to use the turn ratio with the determined stator currents and the saliency angle to determine the low frequency flux vector estimate. The turn ratio mapper thus can dynamically adjust the universal current model with a motor/controller operating point to maintain the correct desired rotor flux output. The observer 26 tracks the voltage model flux estimate at high fundamental frequencies, and the current model flux estimate at zero and low frequencies (e.g., <4 Hz).

In most induction machines, the saliency angle will not be exactly aligned with the rotor flux. The actual alignment can vary significantly as a function of operating point, especially in machines with closed-rotor slots. Thus the turn-ratio a is dynamically adjusted based upon operating point to ensure that the output of the flux observer is rotor flux, independent of the tracked saliency angle. The variable turn-ratio a can be stored as a look-up table or a function that is determined prior to operation and is distinct for each motor design. As described in the aforementioned Jansen et al. article, one such function for aligning saliency with rotor flux is $$a = Lm/Lr \quad (25)$$

The tracked saliency angle $\hat{\theta}_e$ additionally affects the angle of signal injector 18. As shown in FIG. 1, the tracked saliency is subtracted (with subtractor 45 which may be included in or separate from the signal injector) from the rotor flux angle $\hat{\theta}_{rf}$ with the difference being used by the signal injector for transforming (via transformation block 64) the command signal components of the stator voltage in the saliency frame $v_{dsi}^{e*}, v_{qsi}^{e*}$ into the command signal components of stator voltage in the rotor flux frame $v_{dsi}^{rf*}$, $v_{qsi}^{rf*}$ (which, as discussed above, are added by elements 58 and 60 to the command fundamental components of stator voltage in the rotor flux frame).

Field orientation (i.e., torque & flux control in flux regulator and torque current calculator 14) is based upon rotor flux alignment, where the rotor flux angle is obtained from the rotor flux observer. Since the rotor flux angle is generally not aligned with the saliency angle, a rotation of the AC signal voltage commands from the saliency axis to the rotor flux axis is used as discussed. By injecting the AC signal in the saliency axis, the saliency tracking scheme is simplified over previous methods. Furthermore, unlike the aforementioned Blaschke et al. method wherein the AC signal is injected in the estimated rotor flux axis, rotor flux orientation is maintained even when the saliency axis is not aligned with the rotor flux axis through the use of the dynamically adjusted rotor flux observer. The injection in the saliency axis, when combined with the saliency tracker and the dynamically adjusted rotor flux observer, enables the system of the present invention to provide robust control on a wide variety of induction machine designs, provided that a detectable saturation-induced saliency is present, including machines with open and closed rotor slots.

Figure 3:
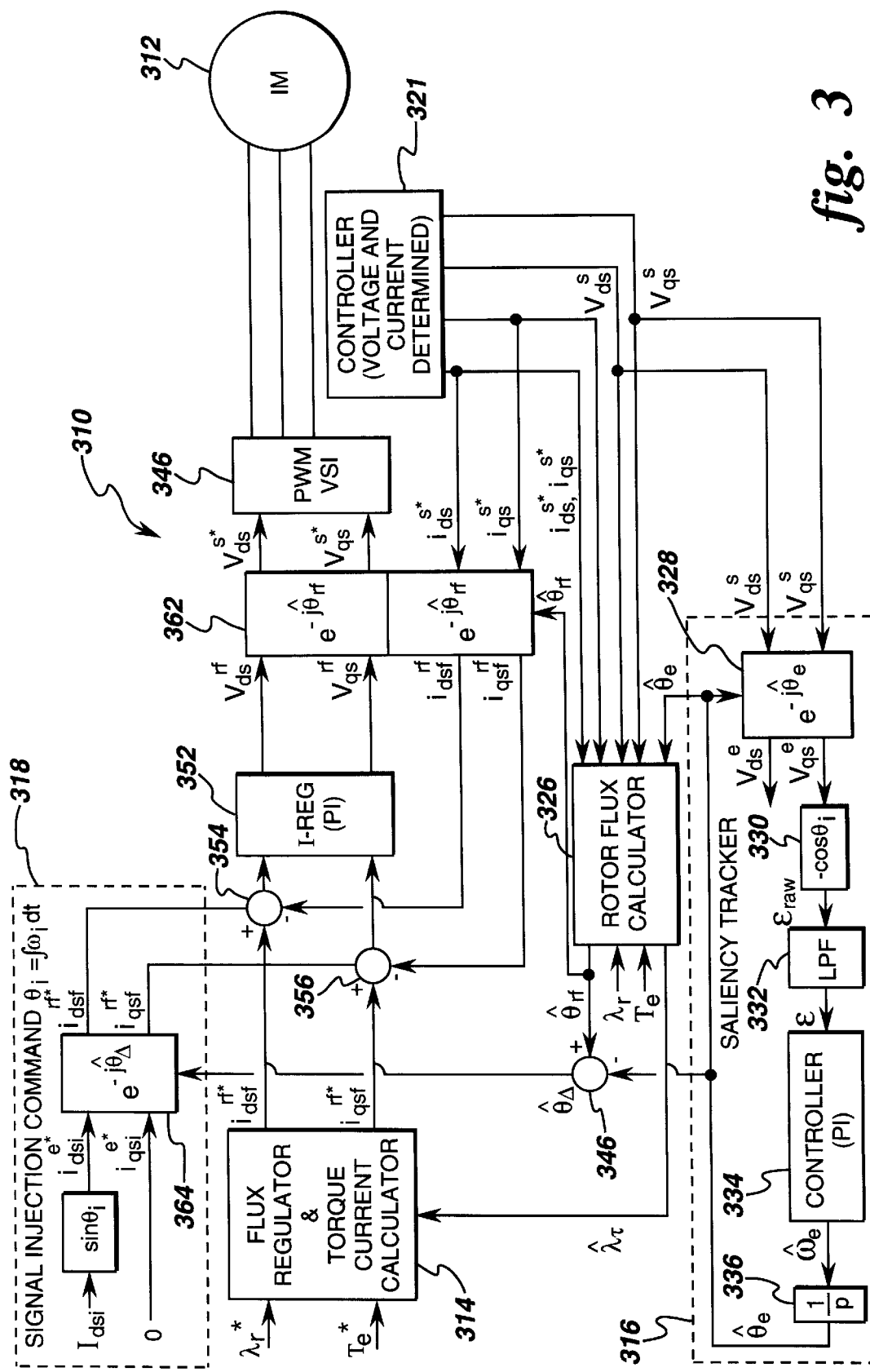
FIG. 3 is a block diagram of another embodiment of a motor drive system of the present invention.

FIG. 3 is a block diagram of another embodiment of a motor drive system 310 of the present invention. As discussed above, a direct field orientation scheme utilizing AC signal current injection rather than voltage is also possible. The implementation is similar to that shown in FIG. 1 with signal voltages and currents swapped in the saliency tracker and signal injection command block. The only other difference is that the signal current commands are added into subtractors 354 and 356 prior to the current regulator (I-Reg).

With signal current injection in the estimated saliency frame such that $$i_{qsi}^{\hat{e}} = 0, \quad (26)$$

and $$i_{dsi}^{\hat{e}} = I_{dsi} \sin \theta_i, \quad (27)$$

where the instantaneous signal injection angle is $$\theta_i = \int \omega_i dt, \quad (28)$$

the signal voltages reduce to $$v_{qsi}^{\hat{e}} = -\Delta L_\sigma \sin(2\theta_{err}) p i_{dsi}^{\hat{e}}, \quad (29)$$

and $$v_{dsi}^{\hat{e}} = R_\sigma i_{dsi}^{\hat{e}} + [L_\sigma - \Delta L_\sigma \cos(2\theta_{err})] p i_{dsi}^{\hat{e}} \quad (30)$$

or $$v_{qsi}^{\hat{e}} = -\Delta L_\sigma \sin(2\theta_{err}) \omega_i I_{dsi} \cos \theta_i, \quad (31)$$

and $$v_{dsi}^{\hat{e}} = R_\sigma I_{dsi} \sin \omega_i t + [L_\sigma - \Delta L_\sigma \cos(2\theta_{err})] \omega_i I_{dsi} \cos \omega_i. \quad (32)$$

Multiplication of the q-axis signal voltage of equation (31) by $-\cos \theta_i$ followed by low pass filtering to remove the twice signal frequency component (and fundamental) yields:

$$\epsilon = LPF(\cdot v_{qsi}^e \cos \theta_i) \cong \frac{1}{2}\Delta L_\sigma \omega_i I_{dsi} \sin[2(\theta_e - \hat{\theta}_e)]. \qquad (33)$$

Thus with current injection, a similar error term is generated that when driven to zero via a PI controller will also yield the saliency angle.

Figure 4:
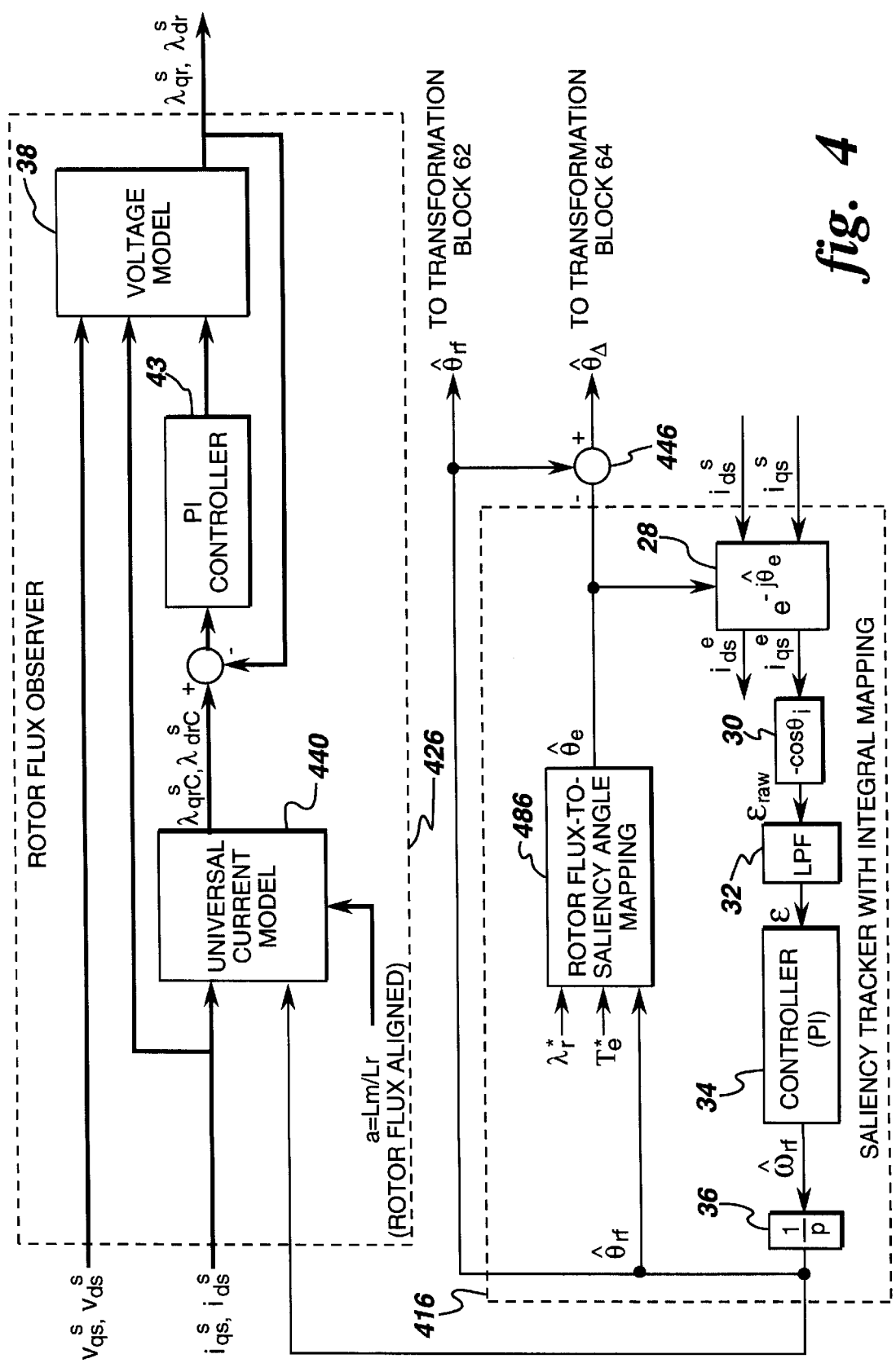
FIG. 4 is a block diagram of another embodiment for a saliency tracker and rotor flux calculator of the present invention.

FIG. 4 is a block diagram of another embodiment for a saliency tracker and rotor flux calculator of the present invention. In this embodiment, a rotor flux-to-saliency angle mapper 486 is present and integral in saliency tracker 416 and the estimated rotor flux angle $\hat{\theta}_{rf}$ is used instead of the saliency angle $\hat{\theta}_e$ as the input signal to universal current model 440 of rotor flux observer 426.

In this embodiment, controller 34, as discussed in FIG. 1, creates a signal $\hat{\omega}_{rf}$ (which is equal to $\hat{\omega}_e$ at steady state) to drive the error $\epsilon$ to zero which is then integrated by integral block 36 to provide rotor flux angle $\hat{\theta}_{rf}$. Rotor flux angle $\hat{\theta}_{rf}$ can be used by mapper 486 to estimate the saliency angle $\hat{\theta}_e$ which is supplied to transformation block 28 and which is subtracted with subtractor 446 from the rotor flux angle to provide a difference angle $\hat{\theta}_\Delta$ which is used by transformation block 64 (shown in FIG. 1). The turn ratio (a) can be aligned with the rotor flux orientation in the universal current model by calculating it as Lm/Lr (the magnetizing inductance divided by the rotor inductance defined as the sum of magnetizing and rotor leakage inductances). By performing the mapping as part of the saliency tracking, a wider range of mapping can be performed.

Figure 5:
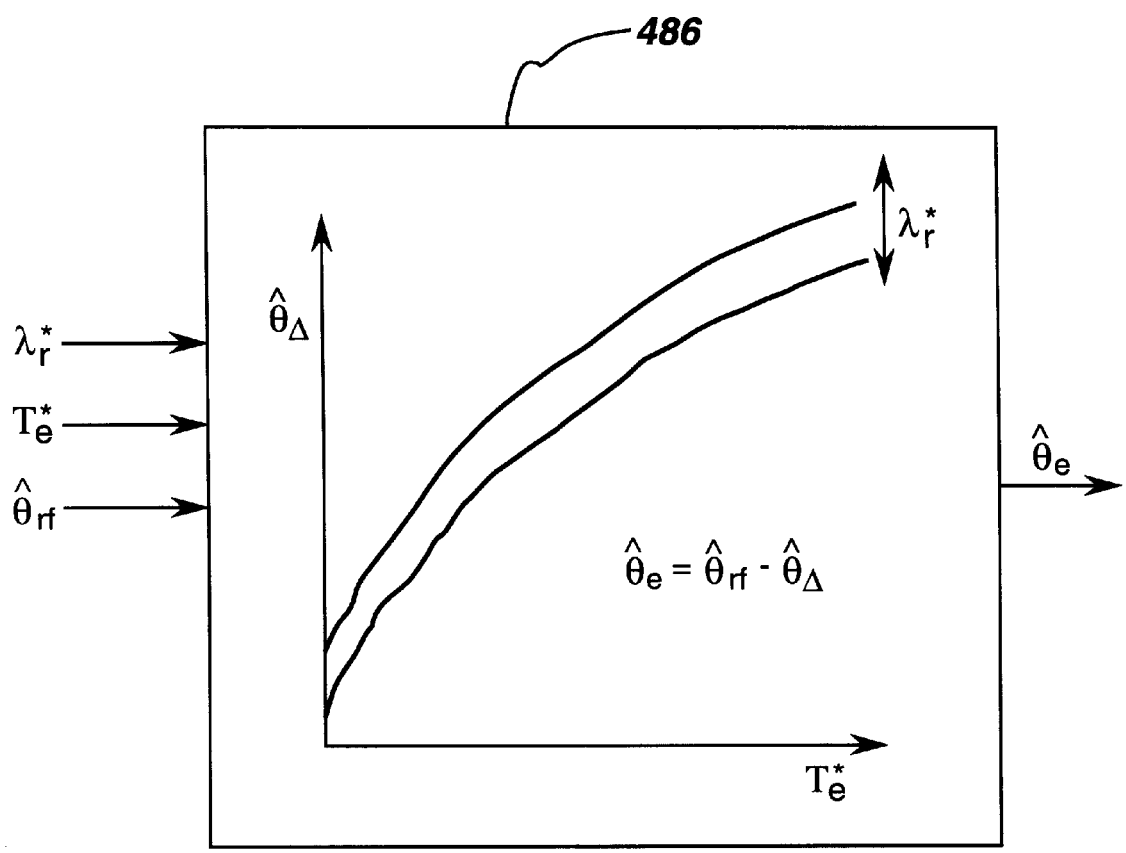
FIG. 5 is a graph representing an example rotor flux-to-saliency angle mapping table function.

FIG. 5 is a graph representing an example rotor flux-to-saliency angle mapping table function which can be used in mapper 486 of FIG. 4. The two curves in FIG. 5 represent a surface function of difference angle $\hat{\theta}_\Delta$ with respect to $T^*_e$ (commanded torque) and $\lambda^*_r$ (commanded rotor flux magnitude). Once the difference angle is determined from the $T^*_e$ and $\lambda^*_r$ table or function, the saliency angle can be estimated by subtracting the difference angle from the rotor flux angle.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A drive system for an induction machine comprising:
   a saliency tracker for tracking an angle of a saturation-induced saliency in a stator transient inductance; and
   a signal injector for aligning an injected AC signal with the tracked saturation-induced saliency angle and adding the aligned injected AC signal to a fundamental AC signal.

2. The system of claim 1 further comprising:
   a field oriented system comprising a flux regulator & torque current calculator, a transformation block, and a PI current regulator for operating the machine in the heavily saturated state to produce the saturation induced saliency in the stator transient inductance;
   voltage and current determiners for determining stator voltages and currents; and
   a rotor flux calculator for using the tracked saturation-induced saliency angle, the determined stator voltages, and the determined stator currents to determine a magnitude and a location of a rotor flux vector,
   wherein the flux regulator & torque current calculator is adapted to use the rotor flux vector to control the induction machine.

3. The system of claim 2 wherein the voltage and current determiners comprise voltage and current sensors for sensing machine line voltages and currents and a feedback transformation block for transforming the machine line voltages and currents to determined stator voltages and currents.

4. The system of claim 2 wherein at least one of the voltage and current determiners is implemented within control software and does not require a voltage or current sensor.

5. The system of claim 2 wherein the rotor flux calculator comprises a rotor flux observer.

6. The system of claim 1 wherein the injected AC signal comprises a voltage command.

7. The system of claim 1 wherein the injected AC signal comprises a current command.

8. The system of claim 1 wherein the saliency tracker is further for determining a rotor flux angle, and further comprising:
   a field oriented system comprising a flux regulator & torque current calculator, a transformation block, and a PI current regulator for operating the machine in the heavily saturated state to produce the saturation induced saliency in the stator transient inductance;
   voltage and current determiners for determining stator voltages and currents; and
   a rotor flux calculator for using the rotor flux angle, the determined stator voltages, and the determined stator currents to determine a magnitude and a location of a rotor flux vector,
   wherein the flux regulator & torque current calculator is adapted to use the rotor flux vector to control the induction machine.

9. The system of claim 8 wherein the rotor flux calculator comprises a rotor flux observer.

10. The system of claim 9 wherein the saliency tracker includes a rotor flux-to-saliency angle mapper.

11. A method for driving an induction machine comprising:
   operating the machine in a heavily saturated state to produce a saturation induced saliency in the stator transient inductance;
   tracking an angle of the saturation-induced saliency in the stator transient inductance;
   aligning an injected AC signal with the tracked saturation-induced saliency angle; and
   adding the aligned injected AC signal to a fundamental AC signal.

12. The method of claim 11 further including:
   determining stator voltages and currents;
   using the tracked saturation-induced saliency angle, the determined stator voltages, and the determined stator currents to determine a magnitude and a location of a rotor flux vector; and
   using the rotor flux vector to control the induction machine.

13. The method of claim 12 wherein determining stator voltages and currents comprises sensing machine line voltages and currents and transforming the machine line voltages and currents to determined stator voltages and currents.

14. The method of claim 11 wherein adding an injected AC signal comprises adding an injected AC voltage command signal or an injected AC current command signal.

15. The method of claim 11 wherein tracking an angle of the saturation-induced saliency in the stator transient inductance includes determining a rotor flux angle, and further including:

determining stator voltages and currents;

using the rotor flux angle, the determined stator voltages, and the determined stator currents to determine a magnitude and a location of a rotor flux vector; and using the rotor flux vector to control the induction machine.

16. The method of claim 15 wherein tracking the angle of the saturation-induced saliency in the stator transient inductance further includes mapping the rotor flux angle to the saturation-induced saliency angle.

17. A drive system for an induction machine comprising:

means for operating the machine in a heavily saturated state to produce a saturation induced saliency in the stator transient inductance;

means for tracking an angle of the saturation-induced saliency in the stator transient inductance; and means aligning an injected AC signal with the tracked saturation-induced saliency angle and adding the aligned injected AC signal to a fundamental AC signal.

18. The system of claim 17 further including:

means for determining stator voltages and currents;

means for using the tracked saturation-induced saliency angle, the determined stator voltages, and the determined stator currents to determine a magnitude and a location of a rotor flux vector; and means for using the rotor flux vector to control the induction machine.

19. The system of claim 17 wherein the means for tracking the angle of the saturation-induced saliency in the stator transient inductance includes means for determining a rotor flux angle, and further including:

means for determining stator voltages and currents;

means for using the rotor flux angle, the determined stator voltages, and the determined stator currents to determine a magnitude and a location of a rotor flux vector; and means for using the rotor flux vector to control the induction machine.

20. The system of claim 19 wherein the means for tracking the angle of the saturation-induced saliency in the stator transient inductance further includes means for mapping between the rotor flux angle and the saturation-induced saliency angle.

* * * * *